United States Patent
Zhang et al.

(10) Patent No.: US 10,445,397 B2
(45) Date of Patent: Oct. 15, 2019

(54) METHOD AND APPARATUS FOR UPLOADING INFORMATION

(71) Applicant: TENCENT TECHNOLOGY (SHENZHEN) COMPANY LIMITED, Shenzhen (CN)

(72) Inventors: Kaixiang Zhang, Shenzhen (CN); Jiejun Zhang, Shenzhen (CN); Jinping Shi, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 246 days.

(21) Appl. No.: 14/732,323

(22) Filed: Jun. 5, 2015

(65) Prior Publication Data
US 2015/0269274 A1   Sep. 24, 2015

Related U.S. Application Data

(63) Continuation of application No. PCT/CN2013/087289, filed on Nov. 18, 2013.

(30) Foreign Application Priority Data

Dec. 6, 2012 (CN) .......................... 2012 1 0520201

(51) Int. Cl.
*G06F 17/00* (2019.01)
*G06F 16/957* (2019.01)
(Continued)

(52) U.S. Cl.
CPC ...... *G06F 16/9577* (2019.01); *G06F 3/04842* (2013.01); *G06F 3/04847* (2013.01); *G06F 8/61* (2013.01); *G06F 16/957* (2019.01)

(58) Field of Classification Search
CPC .............................................. G06F 17/30899
See application file for complete search history.

(56) References Cited

U.S. PATENT DOCUMENTS

| 8,458,656 B1 * | 6/2013 | Liang .................. G06F 9/44521 717/118 |
| 2006/0259588 A1 * | 11/2006 | Lerman ............. G06F 17/30017 709/219 |

(Continued)

FOREIGN PATENT DOCUMENTS

| CN | 101079061 A | 11/2007 |
| CN | 102520843 A | 6/2012 |

(Continued)

OTHER PUBLICATIONS

International Search Report dated Feb. 27, 2014 re: Application No. PCT/CN2013/087289; citing: US 2012260158 A1 and CN 102685213 A.

(Continued)

*Primary Examiner* — Scott T Baderman
*Assistant Examiner* — Barbara M Level
(74) *Attorney, Agent, or Firm* — Oblon, McClelland, Maier & Neustadt, L.L.P.

(57) ABSTRACT

According to an embodiment, a request for browsing a web page is received from a user via a browser of a mobile terminal; whether the web page comprises an input widget is determined; whether the input widget is triggered is determined if the web page comprise the input widget; input information of the user is obtained when the input widget is triggered; the input information is processed by calling a processing interface corresponding to a type of the input widget; and processed input information is uploaded.

19 Claims, 3 Drawing Sheets

```
a picture selector is opened when the picture input widget is triggered    — S131
                                    ↓
a picture selecting instruction is received from the user and a picture file   — S132
    corresponding to the picture selecting instruction is obtained
                                    ↓
picture processing is performed for the picture file by calling a picture   — S133
    processing interface, and the processed picture file is uploaded
```

(51) Int. Cl.
  *G06F 8/61*    (2018.01)
  *G06F 3/0484*  (2013.01)

(56) References Cited

U.S. PATENT DOCUMENTS

| | | | |
|---|---|---|---|
| 2008/0228777 A1* | 9/2008 | Sawant | H04L 67/06 |
| 2010/0241518 A1* | 9/2010 | McCann | G06Q 20/204 |
| | | | 705/17 |
| 2012/0260158 A1 | 10/2012 | Steelberg | |
| 2012/0303477 A1* | 11/2012 | Ben-Itzhak | G06Q 30/02 |
| | | | 705/26.7 |
| 2013/0117692 A1* | 5/2013 | Padmanabhan | H04N 21/4126 |
| | | | 715/753 |
| 2013/0125247 A1* | 5/2013 | Sprague | G06F 21/60 |
| | | | 726/28 |
| 2013/0263160 A1* | 10/2013 | Sandholm | G06F 9/541 |
| | | | 719/328 |

FOREIGN PATENT DOCUMENTS

| | | | |
|---|---|---|---|
| CN | 102685213 A | 9/2012 | |
| CN | 102799371 A | 11/2012 | |

OTHER PUBLICATIONS

CN Office Action dated Mar. 4, 2015 re: Application No. CN 201210520201.5; citing: CN 102520843A, CN 101079061A and CN 102799371A; p. 1-6.
International Preliminary Report on Patentability dated Jun. 18, 2015 re: Application No. PCT/CN2013/087289; citing: US201260158A1 and CN102685213A; pp. 1-6.

\* cited by examiner

METHOD AND APPARATUS FOR UPLOADING INFORMATION

CROSS REFERENCE TO RELATED APPLICATIONS

This application is a continuation of International Application No. PCT/CN2013/087289, filed on Nov. 18, 2013, which claims priority to Chinese Patent Application No. 201210520201.5, filed on Dec. 6, 2012, the entire contents of all of which are incorporated herein by reference in their entirety for all purposes.

FIELD OF THE INVENTION

The present disclosure relates to browser technologies, more particularly to, a method and apparatus for uploading information.

BACKGROUND OF THE INVENTION

A mobile terminal browser refers to a browser running on a mobile terminal. The mobile terminal may be a mobile phone, a PAD and etc. Internet information may be browsed by using the mobile terminal browser via a wireless network. Along with the development of the Internet, the browser is more and more important. Users may browse information via the browser, and may upload information via the browser, so that other users may browse the uploaded information.

Because of limitations caused by the mobile terminal and network bandwidth, when information is uploaded by the user via the mobile terminal, the format and size of the information is always limited by the browser, especially when the information is a picture file. In addition, the user may need to process the picture before uploading the picture. In this way, the user has to exit the browser firstly and then uploads the picture after processing the picture by using a picture processing tool on the mobile terminal, which causes great inconvenience for the user.

SUMMARY OF THE INVENTION

Embodiments of the present disclosure provide a method and apparatus for uploading information, so as to facilitate information uploading performed by a user via a mobile terminal browser.

A method for uploading information includes:
receiving a request for browsing a web page from a user via a browser of a mobile terminal;
determining whether the web page comprises an input widget;
determining whether the input widget is triggered if the web page comprises the input widget;
obtaining input information of the user when the input widget is triggered;
processing the input information by calling a processing interface corresponding to a type of the input widget; and
uploading processed input information.

An apparatus for uploading information includes:
a widget monitoring module, to receive a request for browsing a web page from a user, determine whether the web page comprise an input widget, and determining whether the input widget is triggered if the web page comprise the input widget; and
an information processing module, to obtain input information of the user when the input widget is triggered, process the input information by calling a processing interface corresponding to a type of the input widget, and upload processed input information.

A non-transitory machine-readable storage medium, storing computer programs, which, when executed by a processor, will cause the processor to
receive a request for browsing a web page from a user via a browser of a mobile terminal;
determine whether the web page comprises an input widget;
determine whether the input widget is triggered if the web page comprises the input widget;
obtain input information of the user when the input widget is triggered;
process the input information by calling a processing interface corresponding to a type of the input widget; and
upload processed input information.

According to the solutions of the present disclosure, when the user browses the web page and needs to upload information via the browser of the mobile terminal, the processing interface is called and used to process the input information of the user. In this way, the user does not need to exit the browser, thereby facilitating operations of the user.

DETAILED DESCRIPTION OF THE INVENTION

The embodiments of the present application provide the following technical solutions.

The following description is merely illustrative in nature and is in no way intended to limit the disclosure, its application, or uses. The broad teachings of the disclosure can be implemented in a variety of forms. Therefore, while this disclosure includes particular embodiments, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of embodiments anywhere in this specification, including embodiments of any terms discussed herein, is illustrative only, and in no way limits the scope and meaning of the disclosure or of any exemplified term. Likewise, the disclosure is not limited to various embodiments given in this specification.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting embodiments of the non-transitory tangible computer readable medium are nonvolatile memory, magnetic storage, and optical storage.

The description will be made as to the various embodiments in conjunction with the accompanying drawings in FIGS. 1-8. It should be understood that specific embodiments described herein are merely intended to explain the present disclosure, but not intended to limit the present disclosure. In accordance with the purposes of this disclosure, as embodied and broadly described herein, this disclosure, in one aspect, relates to method and apparatus for uploading information.

Embodiments of mobile terminals that can be used in accordance with various embodiments include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones miming the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to one skilled in the art.

Figure 1:
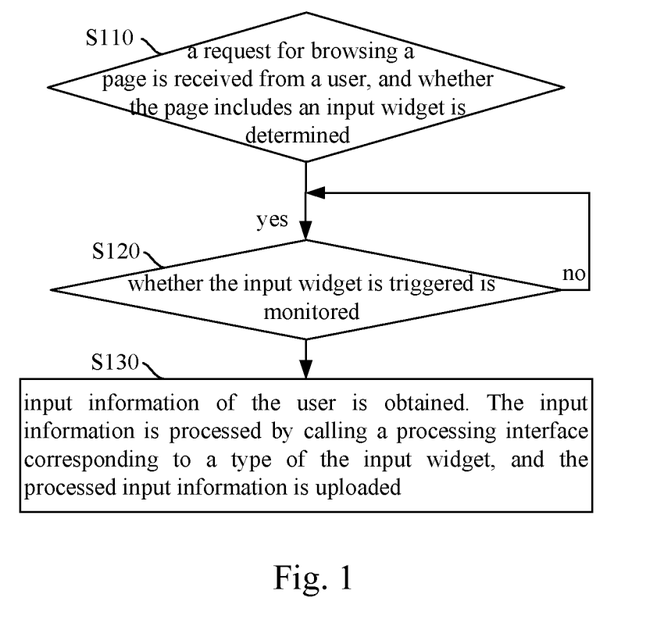
FIG. 1 is a schematic flowchart illustrating a method for uploading information according to various embodiments of the present disclosure.

FIG. 1 is a schematic flowchart illustrating a method for uploading information according to various embodiments of the present disclosure. As shown in FIG. 1, the method includes the following processing.

At S110, a request for browsing a web page is received from a user, and whether the web page includes an input widget is determined. If the web page includes the input widget, processing at S120 is performed. If the web page does not include the input widget, the procedure is terminated.

At S120, whether the input widget is triggered is monitored. If the input widget is triggered, processing at S130 is performed. If the input widget is not triggered, processing at S120 is performed.

At S130, input information of the user is obtained. The input information is processed by calling a processing interface corresponding to a type of the input widget, and the processed input information is uploaded.

According to an embodiment, the method for uploading information may be performed by a browser of a mobile terminal. The request may be received after the user inputs an address into an address bar of the mobile terminal browser, or may be received after the user points a hyperlink.

After receiving the request for browsing the web page, the browser obtains web page data from a network server, and displays the web page via a window of the browser. A background of the browser detects whether the web page data include an input widget. When the web page data includes the input widget and the input widget is triggered, a processing interface is called according to the type of the input widget and then is used to process the input information input by the user. The processed information is added to an input box of the web page. Or, the processed information may be stored in a temporary storing unit of the browser, and a storing path of the processed information is added to the input box of the web page. After the user points a button to trigger the information uploading, the background of the browser uploads the information in the input box of the web page to the network server.

According to an embodiment, the method for uploading information may be performed by a server. After obtaining the input information and an information processing command, the browser of the mobile terminal sends the input information and the information processing command to an information processing module of the server. The server processes the input information according to the information processing command. The server may directly upload a processing result to the network server. Or, the server may return the processing result to the browser to display the processing result, and upload the processed input information to the network server after receiving an uploading request from the user. The server may be a transfer server or a cloud server located between the network server and the browser.

According to the embodiment, information processing functions are performed by the server rather than the browser of the mobile terminal, thereby reducing calculating burden of a processor in the mobile terminal.

In the embodiments of the present application, when the user browses the web page and needs to upload information via the browser of the mobile terminal, the processing interface is called and is used to process the input information of the user. In this way, the user does not need to exit the browser, thereby facilitating operations of the user.

Figure 2:
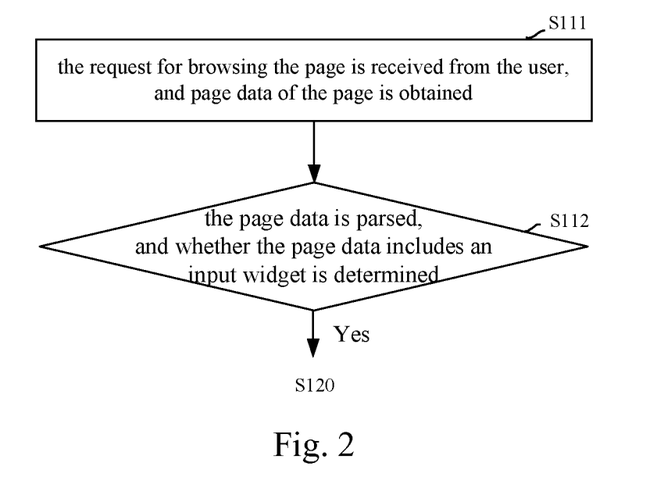
FIG. 2 is a schematic flowchart illustrating a procedure of detecting an input widget in a web page according to various embodiments of the present disclosure.

As shown in FIG. 2, the processing at S110 may be as follows.

At S111, the request for browsing the web page is received from the user, and web page data of the web page is obtained.

At S112, the web page data is parsed, and whether the web page data includes an input widget is determined.

After receiving the request for browsing the web page, the browser sends the request for browsing the web page to the network server and obtains the web page data corresponding to the web page from the network server. Then, the browser parses the web page data, generates a dom tree, and traverses tag data of each node in the dom tree. If the tag data includes a form tag, the browser establishes a form object according to content of the form tag and configures attributes of the form object. If the tag data includes an input tag and a type attribute is file, the browser establishes an input object according to content of the input tag and adds variable attributes for the input object.

For example, when the input object is a text input object, a text variable is added for the input object and an initial value is false. After the input object is triggered, the text variable is configured as true. When the input object is a picture input object, an image variable is added for the input object and an initial value is false. After the input object is triggered, the image variable is configured as true. When the input object is an audio-video input object, a video variable is added for the input object and an initial value is false. After the input object is triggered, the video variable is configured as true.

After the dom tree is traversed, it is determined whether there is an input object. If there is the input object, it is determined that the web page data includes the input widget. If the input widget is included, the variable change of the input object is monitored to determine whether the input widget is triggered.

Figure 3:
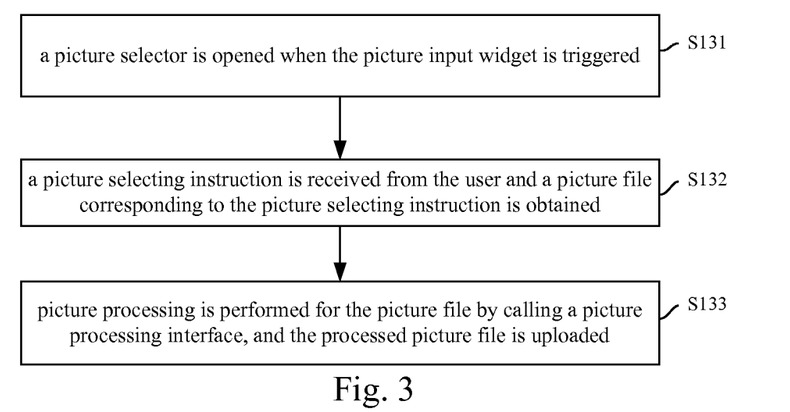
FIG. 3 is a schematic flowchart illustrating a procedure of uploading information when an input widget is a picture input widget according to various embodiments of the present disclosure.

As shown in FIG. 3, when the input widget is a picture input widget, the processing at S130 may be as follows.

At S131, a picture selector is opened when the picture input widget is triggered.

At S132, a picture selecting instruction is received from the user and a picture file corresponding to the picture selecting instruction is obtained.

At S133, picture processing is performed for the picture file by calling a picture processing interface, and the processed picture file is uploaded.

According to an embodiment, after it is determined that the image variable of the input object is configured as true, the picture selector is opened for the user to select a picture. For example, by using the picture selector, the user may obtain a picture file stored in the mobile terminal, or the user may select a picture link on the network to obtain a picture file on the network, or the user may obtain a picture file shot by a camera device of the mobile terminal. After the picture file is obtained, the picture processing interface is called to perform picture processing for the picture file. A storing path of the processed information is added to the input box of the web page.

For the purpose of not occupying stage space of the browser, the processed picture file is stored in the temporary storing unit of the browser of mobile terminal. The storing path of the information is a storing path of the processed picture file in the temporary storing unit. After receiving the uploading request, the processed picture file is obtained from the temporary storing unit according to the storing path in the input box, and then the processed picture file is uploaded.

According to various embodiments, the picture processing includes at least one of image cropping, image format conversion, image compression, image filter. After the picture processing, the picture to be uploaded satisfies requirements of the browser and also satisfies requirements of the user, and thus the user may obtain the picture with satisfied picture effect.

Figure 4:
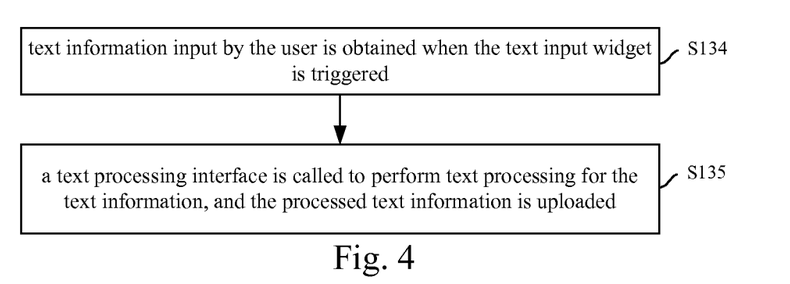
FIG. 4 is a schematic flowchart illustrating a procedure of uploading information when an input widget is a text input widget according to various embodiments of the present disclosure.

As shown in FIG. 4, when an input widget is a text input widget, the processing at S130 may include be as follows.

At S134, text information input by the user is obtained when the text input widget is triggered.

At S135, a text processing interface is called to perform text processing for the text information, and the processed text information is uploaded.

According to an embodiment, after it is determined that the text variable of the input object is configured as true, the text information input by the user is obtained. The text processing interface is called to perform text processing for the text information. A storing path of the processed information is added to the input box of the web page.

For the purpose of not occupying stage space of the browser, the processed text information is stored in the temporary storing unit of the browser of mobile terminal. The storing path of the information is a storing path of the processed text information in the temporary storing unit. After receiving the uploading request, the processed text information is obtained from the temporary storing unit and then the processed text information is uploaded.

According to various embodiments, the text processing includes at least one of changing text size, changing text color, changing text effects. After the text processing, the text to be uploaded satisfies requirements of the user, so that the user may obtain the text with satisfied text effect.

Figure 5:
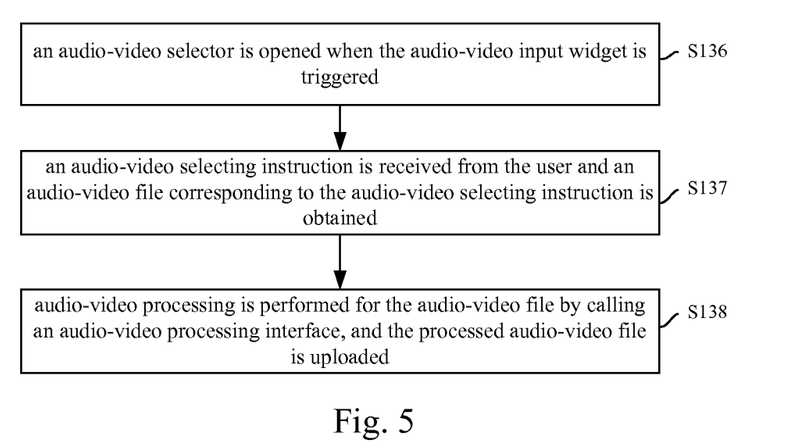
FIG. 5 is a schematic flowchart illustrating a procedure of uploading information when an input widget is an audio-video input widget according to various embodiments of the present disclosure.

As shown in FIG. 5, when the input widget is an audio-video input widget, the processing at S130 may be as follows.

At S136, an audio-video selector is opened when the audio-video input widget is triggered.

At S137, an audio-video selecting instruction is received from the user and an audio-video file corresponding to the audio-video selecting instruction is obtained.

At S138, audio-video processing is performed for the audio-video file by calling an audio-video processing interface, and the processed audio-video file is uploaded.

According to an embodiment, after it is determined that the video variable of the input object is configured as true, the audio-video selector is opened for the user to select an audio-video file. For example, by using the audio-video selector, the user may obtain an audio-video file stored in the mobile terminal, or the user may select an audio-video link on the network to obtain an audio-video file on the network, or the user may obtain an audio-video file shot by a camera device of the mobile terminal. After the audio-video file is obtained, the audio-video processing interface is called to process the audio-video file. A storing path of the processed information is added to the input box of the web page.

The storing path of the information is a storing path of the processed audio-video file in temporary storing unit. After receiving the uploading request, the processed audio-video file is obtained from the temporary storing unit according to the storing path in the input box, and then the processed audio-video file is uploaded.

According to various embodiments, the processing for the audio-video file includes at least one of audio-video format conversion, encoding and decoding format conversion, file compression.

Figure 6:
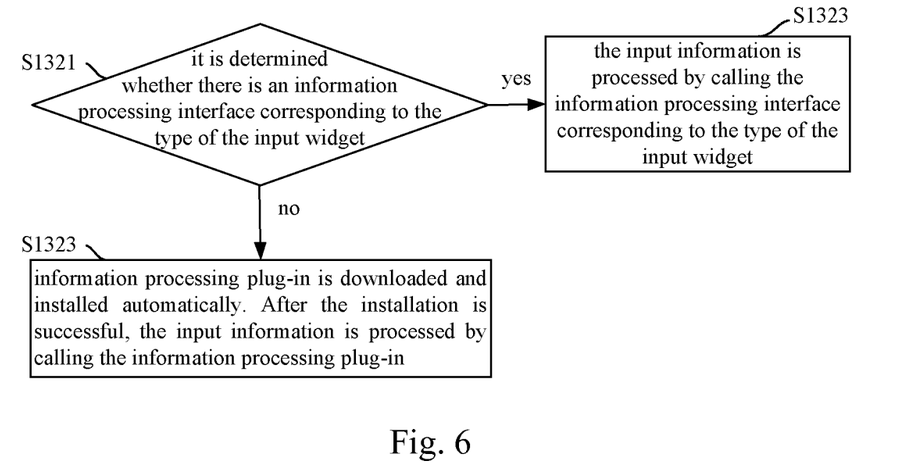
FIG. 6 is a schematic flowchart illustrating a procedure of calling an processing interface based on a type of an input widget according to various embodiments of the present disclosure.

FIG. 6 is a schematic flowchart illustrating a procedure of calling a processing interface based on a type of an input widget according to various embodiments of the present disclosure. As shown in FIG. 6, the procedure includes the following processing.

At S1321, it is determined whether there is an information processing interface corresponding to the type of the input widget. If there is the information processing interface corresponding to the type of the input widget, processing at S1323 is performed, if there is no information processing interface corresponding to the type of the input widget, processing at S1322 is performed.

At S1322, information processing plug-in is downloaded and installed automatically. After the installation is successful, the input information is processed by calling the information processing plug-in.

At S1323, the input information is processed by calling the information processing interface corresponding to the type of the input widget.

When the processing interface is called, it may be determined whether a processing program corresponding to the type of the input widget is installed. If the processing program corresponding to the type of the input widget is installed, the input information is processed by directly calling the information processing interface corresponding to the type of the input widget. If the processing program corresponding to the type of the input widget is not installed, the information processing plug-in is downloaded and installed automatically. After the installation is finished, the input information is processed by calling the information processing plug-in.

The information processing interface may be embedded into the browser of the mobile terminal when the browser is released. Or the information processing interface may be installed in the procedure of using the browser after downloading the information processing plug-in, so that the browser may call the information processing interface to process information when needing to upload the information.

Figure 7:
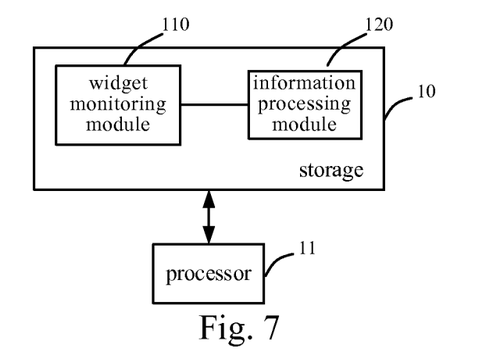
FIG. 7 is a schematic diagram illustrating a structure of an apparatus for uploading information according to various embodiments of the present disclosure.

FIG. 7 is a schematic diagram illustrating a structure of an apparatus for uploading information according to various embodiments of the present disclosure. As shown in FIG. 7, the apparatus includes storage 10 and a processor 11. According to an embodiment, the storage 10 may be non-transitory computer readable storage medium. The storage 10 stores computer readable instructions for implementing a widget monitoring module 110 and an information processing module 120. The processor 11 may execute the computer readable instructions stored in the storage 10.

The widget monitoring module 110 is to receive a request for browsing a web page from a user, determine whether the web page includes an input widget, and monitor whether the input widget is triggered if the web page includes the input widget.

The information processing module 120 is to obtain input information of the user when the input widget is triggered, process the input information by calling a processing interface corresponding to a type of the input widget, and upload processed input information.

According to an embodiment, the apparatus may be located in a browser of a mobile terminal. The request may be received after the user inputs an address into an address bar of the mobile terminal browser, or may be received after the user points a hyperlink.

After receiving the request for browsing the web page, the browser obtains web page data from a network server, and displays the web page via a window of the browser. The widget monitoring 110 detects whether the web page data includes an input widget. When the web page data includes the input widget and the input widget is triggered, the information processing module 120 calls a processing interface corresponding to the type of the input widget, processes the input information of the user, and adds the processed information to an input box of the web page. Or, the processed information may be stored in a temporary storing unit of the browser, and a storing path of the processed information is added to the input box of the web page. After the user points a button to trigger the information uploading, the information processing module 120 uploads the information in the input box of the web page to the network server.

According to an embodiment, the apparatus for uploading information may be located in a server. After obtaining the input information and an information processing command, the browser of the mobile terminal sends the input information and the information processing command to an information processing module of the server. The server processes the input information according to the information processing command. The server may directly upload a processing result to the network server. Or, the server may return the processing result to the browser to display the processing result, and upload the processed input information to the network server after receiving an uploading request from the user. The server may be a transfer server, or a cloud server located between the network server and the browser.

According to the embodiment, information processing functions are performed by the server rather than the browser of the mobile terminal, thereby reducing calculating burden of a processor in the mobile terminal.

In the embodiments of the present application, when the user browses the web page and needs to upload information via the browser of the mobile terminal, the processing interface is called and is used to process the input information of the user. In this way, the user does not need to exit the browser, thereby facilitating operations of the user.

The widget monitoring module 110 is to receive the request for browsing the web page from the user, obtain web page data of the web page, parse the web page data, determine whether the web page data includes an input widget, and monitor whether the input widget is triggered if the web page data includes the input widget.

According to an embodiment, the widget monitoring module 110 is to receive the request for browsing the web page from the user. The browser sends the request for browsing the web page to the network server, and obtains the web page data of the web page from the network server. Then the widget monitoring module 110 parses the web page data and determines whether the web page data includes the input widget. If the web page data includes the input widget, the widget monitoring module 110 monitors whether the input widget is triggered.

Figure 8:
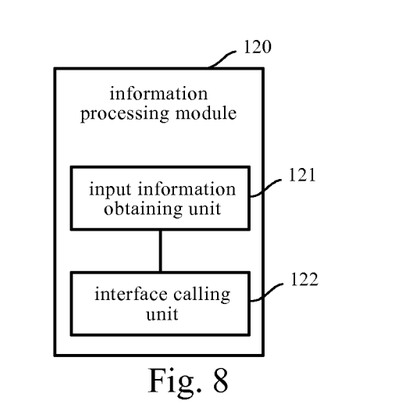
FIG. 8 is a schematic diagram illustrating a structure of an information processing module in an apparatus for uploading information according to various embodiments of the present disclosure.

FIG. 8 is a schematic diagram illustrating a structure of an information processing module in an apparatus for processing information uploaded by a mobile terminal browser according to various embodiments of the present disclosure. As shown in FIG. 8, the information processing module 120 includes an input information obtaining unit 121 and an interface calling unit 122.

When the input widget is a picture input widget, the input information obtaining unit 121 is to open a picture selector when the picture input widget is triggered, receive a picture selecting instruction from the user and obtain a picture file corresponding to the picture selecting instruction;

the interface calling unit 122 is to perform picture processing for the picture file by calling a picture processing interface, add a path of the processed picture file to an input box of the page, and upload the processed picture file.

According to an embodiment, after determining the picture input widget is triggered, the input information obtaining unit 121 opens the picture selector for the user to select a picture. For example, by using the picture selector, the user may obtain a picture file stored in the mobile terminal, or the user may select a picture link on the network to obtain a picture file on the network, or the user may obtain a picture file shot by a camera device of the mobile terminal. After the user selects the picture file by using the picture selector, the interface calling unit 122 obtains the picture file selected by the user, calls the picture processing interface to perform picture processing for the picture file and adds a storing path of the processed information to the input box of the web page.

For the purpose of not occupying stage space of the browser, the processed picture file is stored in the temporary storing unit of the browser of mobile terminal. The storing path of the information is a storing path of the processed picture file in the temporary storing unit. After receiving the uploading request, the processed picture file is obtained from the temporary storing unit according to the storing path in the input box, and then the processed picture file is uploaded.

According to various embodiments, the picture processing includes at least one of image cropping, image format conversion, image compression, image filter. After the picture processing, the picture to be uploaded satisfies requirements of the browser and also satisfies requirements of the user, and thus the user may obtain the picture with satisfied picture effect.

When the input widget includes a text input widget, the input information obtaining unit 121 is to obtain text information input by the user when the text input widget is triggered. The interface calling unit 122 is to call a text processing interface to perform text processing for the text information, add the processed text information to an input box of the web page, and upload the processed text information.

According to an embodiment, after it is determined that the text variable of the input object is configured as true, the text information input by the user is obtained. The text processing interface is called to perform text processing for the text information. A storing path of the processed information is added to the input box of the web page.

For the purpose of not occupying stage space of the browser, the processed text information is stored in the temporary storing unit of the browser of mobile terminal. The storing path of the information is a storing path of the processed text information in the temporary storing unit. After receiving the uploading request, the processed text information is obtained from the temporary storing unit and then the processed text information is uploaded.

According to various embodiments, the text processing includes at least one of changing text size, changing text color, changing text effects. After the text processing, the text to be uploaded satisfies requirements of the user, so that the user may obtain the text with satisfied text effect.

When the input widget is an audio-video input widget, the input information obtaining unit 121 is to open an audio-video selector when the audio-video input widget is triggered, receive an audio-video selecting instruction from the user and obtain an audio-video file corresponding to the audio-video selecting instruction;

the interface calling unit 122 is to perform audio-video processing for the audio-video file by calling an audio-video processing interface, add a path of the processed audio-video file to an input box of the web page, and upload the processed audio-video file.

According to an embodiment, after it is determined that the video variable of the input object is configured as true, the audio-video selector is opened for the user to select an audio-video file. After the audio-video file is obtained, the audio-video processing interface is called to process the audio-video file. A storing path of the processed information is added to the input box of the web page. After receiving the uploading request, the processed audio-video file is obtained from the temporary storing unit according to the storing path in the input box, and then the processed audio-video file is uploaded.

According to various embodiments, the processing for the audio-video file includes at least one of audio-video format conversion, encoding and decoding format conversion, file compression.

According to an embodiment, the information processing module 120 is further to determine whether there is an information processing interface corresponding to the type of the input widget, download. When there is no information processing interface corresponding to the type of the input widget, the information processing module 120 is to download and install information processing plug-in automatically, and process the input information by calling the information processing plug-in. When there is the information processing interface corresponding to the type of the input widget, the information processing module 120 is to process the input information by calling the information processing interface corresponding to the type of the input widget.

The information processing interface may be embedded into the browser of the mobile terminal when the browser is released. Or the information processing interface may be installed in the procedure of using the browser after downloading the information processing plug-in, so that the browser may call the information processing interface to process information when needing to upload the information.

Therefore, when the information processing interface is called, whether there is the information processing interface in the browser of the mobile terminal is determined, when there is no information processing interface corresponding to the type of the input widget, the information processing plug-in is downloaded and installed automatically, thereby facilitating operations of the user.

The methods and modules described herein may be implemented by hardware, machine-readable instructions or a combination of hardware and machine-readable instructions. Machine-readable instructions used in the embodiments disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above embodiments and that may make the system or the apparatus (or CPU or MPU) read and execute the program codes stored in the storage medium.

In this situation, the program codes read from the storage medium may implement any one of the above embodiments, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above embodiments.

In addition, the program codes implemented from a storage medium are written in storage in an extension board inserted in the computer or in storage in an extension unit connected to the computer. In this embodiment, a CPU in the extension board or the extension unit executes at least part of the operations according to the instructions based on the program codes to realize a technical scheme of any of the above embodiments.

The foregoing is only preferred embodiments of the present disclosure and is not used to limit the protection scope of the present disclosure. Any modification, equivalent substitution and improvement without departing from the spirit and principle of the present disclosure are within the protection scope of the present disclosure.

The invention claimed is:

1. A method for uploading input information, the method comprising:
   receiving, by processing circuitry of a terminal, a request for browsing a web page from a user via a browser;
   obtaining web page data corresponding to the web page from a network server;
   determining, by the processing circuitry of the terminal, whether the web page data comprises an input object that prompts the user to upload the input information that is to be processed by an input widget;
   determining which one of a plurality of different media types is associated with the input information that the user is prompted to upload based on data parsed from the web page data, the plurality of different media types including a still picture type and an audio-video type;
   determining whether the user selects the input object when the web page data is determined to comprise the input object;
   obtaining the input information of the user when the input object is determined to be selected by the user;
   calling a processing interface corresponding to the one of the plurality of different media types that is determined to be associated with the input information, wherein the processing interface is selected from a plurality of processing interfaces according to the one of the plurality of different media types and is configured to perform a predetermined process on the obtained input information, the plurality of processing interfaces including a picture processing interface and an audio-video processing interface, and the calling the processing interface triggers the processing circuitry to check whether the processing interface corresponding to a type of the input widget is installed on the terminal;
   automatically downloading and installing an information processing plug-in on the terminal when the processing interface corresponding to the type of the input widget is determined not to be installed on the terminal and processing the obtained input information by calling the installed information processing plug-in; and
   uploading the processed input information to the network server, wherein
   the called process interface is the picture processing interface that is configured to perform the predetermined process on the obtained input information when the one of the plurality of different media types is determined to be associated with the still picture type, and
   the called process interface is the audio-video processing interface that is configured to perform the predetermined process on the obtained input information when the one of the plurality of different media types is determined to be associated with the audio-video type.

2. The method of claim 1, wherein
the input object comprises a picture input object;
the obtaining the input information of the user when the input object is selected includes:
   opening a picture selector when the picture input object is selected by the user;
   receiving a picture selecting instruction from the user; and
   obtaining a picture file corresponding to the picture selecting instruction; and the processing the obtained input information by calling the information processing plug-in includes performing picture processing for the picture file by calling the picture processing interface; and the uploading the processed input information to the network server includes uploading the processed picture file to the network server.

3. The method of claim 2, wherein the picture processing comprises at least one of image cropping, image format conversion, image compression, and image filtering.

4. The method of claim 1, wherein the plurality of different media types further includes a text type;

the plurality of processing interfaces further includes a text processing interface;

the input object comprises a text input widget object;

the obtaining the input information of the user when the input object is selected includes obtaining text information input by the user when the text input object is selected;

the processing the obtained input information by calling the information processing plug-in includes processing the text information by calling the text processing interface when the media type is determined to be associated with the text type; and the uploading the processed input information to the network server includes uploading the processed text information to the network server.

5. The method of claim 1, wherein the input object comprises an audio-video input object;

the obtaining the input information of the user when the input object is selected includes:

opening an audio/video selector when the audio-video input object is selected, receiving an audio-video selecting instruction from the user, and obtaining an audio-video file corresponding to the audio-video selecting instruction;

the processing the obtained input information by calling the information processing plug-in includes processing the audio-video file by calling the audio-video processing interface; and the uploading the processed input information to the network server includes uploading the processed audio-video file to the network server.

6. The method of claim 1, wherein the input object is an HTML Document Object Model (DOM) input object.

7. The method of claim 1, wherein the plurality of different media types further include a text type.

8. A terminal for uploading input information, the terminal comprising:

processing circuitry configured to:

receive a request for browsing a web page from a user via a browser, obtain web page data corresponding to the web page from a network server, determine whether the web page data comprises an input object that prompts the user to upload the input information that is to be processed by an input widget, determine which one of a plurality of different media types is associated with the input information that the user is prompted to upload based on data parsed from the web page data, the plurality of different media types including a still picture type and an audio-video type, determine whether the user selects the input object when the web page data is determined to comprise the input object, obtain the input information of the user when the input object is determined to be selected by the user, call a processing interface corresponding to the one of the plurality of different media types that is determined to be associated with the input information, wherein the processing interface is selected from a plurality of processing interfaces according to the one of the plurality of different media types and is configured to perform a predetermined process on the obtained input information, the plurality of processing interfaces including a picture processing interface and an audio-video processing interface, and the calling the processing interface triggers the processing circuitry to check whether the processing interface corresponding to a type of the input widget is installed on the terminal, automatically download and install an information processing plug-in on the terminal when the processing interface corresponding to the type of the input widget is determined not to be installed on the terminal and process the obtained input information by calling the installed information processing plug-in, and upload the processed input information to the network server, wherein the picture processing interface is called to process the obtained input information when the one of the plurality of different media types is determined to be associated with the still picture type, and the audio-video processing interface is called to process the obtained input information when the one of the plurality of different media types is determined to be associated with the audio-video type.

9. The terminal of claim 8, wherein the input object comprises at least one of a picture input object, a text input object, and an audio-video input object.

10. The terminal of claim 8, wherein the terminal is a mobile terminal with a browser or is a server.

11. The terminal of claim 8, wherein the input object comprises a picture input object; and the processing circuitry is further configured to:

open a picture selector when the picture input object is selected by the user, receive a picture selecting instruction from the user, obtain a picture file corresponding to the picture selecting instruction, perform picture processing for the picture file by calling the picture processing interface, and upload the processed picture file to the network server.

12. The terminal of claim 11, wherein the picture processing comprises at least one of image cropping, image format conversion, image compression, and image filtering.

13. The terminal of claim 8, wherein the plurality of different media types further includes a text type;

the plurality of processing interfaces further includes a text processing interface;

the input object comprises a text input object; and the processing circuitry is further configured to obtain text information input by the user when the input object is selected;

process the text information by calling the text processing interface when the one of the plurality of different media types is determined to be associated with the text type, and upload the processed text information to the network server.

14. The terminal of claim 8, wherein
the input object comprises an audio-video input object; and
the processing circuitry is further configured to:
open an audio/video selector when the audio-video input object is selected;
receive an audio-video selecting instruction from the user,
obtain an audio-video file corresponding to the audio-video selecting instruction,
process the audio-video file by calling the audio-video processing interface, and
upload the processed audio-video file to the network server.

15. A non-transitory machine-readable storage medium, storing computer programs, which, when executed by a processor of a terminal, cause the processor to:
receive a request for browsing a web page from a user via a browser;
obtain web page data corresponding to the web page from a network server;
determine whether the web page data comprises an input object that prompts the user to upload input information that is to be processed by an input widget;
determine which one of a plurality of different media types is associated with the information that the user is prompted to upload based on data parsed from the web page data, the plurality of different media types includes a still picture type and an audio-video type;
determine whether the user selects the input object when the web page data is determined to comprise the input object;
obtain the input information of the user when the input object is determined to be selected by the user;
call a processing interface corresponding to the one of the plurality of different media types that is determined to be associated with the input information, wherein the processing interface is selected from a plurality of processing interfaces according to the one of the plurality of different media types and is configured to perform a predetermined process on the obtained input information, the plurality of processing interfaces including a picture processing interface and an audio-video processing interface, and the calling the processing interface triggers the processor to check whether the processing interface corresponding to a type of the input widget is installed on the terminal;
automatically download and install an information processing plug-in on the terminal when the processing interface corresponding to the type of the input widget is determined not to be installed on the terminal and process the input information by calling the installed information processing plug-in; and upload the processed input information to the network server, wherein
the picture processing interface is called to process the obtained input information when the one of the plurality of different media types is determined to be associated with the still picture type, and
the audio-video processing interface is called to process the obtained input information when the one of the plurality of different media types is determined to be associated with the audio-video type.

16. The non-transitory machine-readable storage medium of claim 15, wherein
the input object comprises a picture input object; and
the computer programs, when executed by the processor, cause the processor to:
open a picture selector when the picture input object is selected,
receive a picture selecting instruction from the user,
obtain a picture file corresponding to the picture selecting instruction,
perform picture processing for the picture file by calling the picture processing interface, and
upload the processed picture file to the network server.

17. The non-transitory machine-readable storage medium of claim 15, wherein the picture processing comprises at least one of image cropping, image format conversion, image compression, and image filtering.

18. The non-transitory machine-readable storage medium of claim 15, wherein
the plurality of different media types further includes a text type;
the plurality of processing interfaces further includes a text processing interface;
the input widget comprises a text input widget; and
the computer programs, when executed by the processor, cause the processor to:
obtain text information input by the user when the text input object is selected,
process the text information by calling the text processing interface when the media type is determined to be associated with the text type, and
upload the processed text information to the network server.

19. The non-transitory machine-readable storage medium of claim 15, wherein
the input object comprises an audio-input object; and
the computer programs, when executed by the processor, cause the processor to
open an audio/video selector when the audio-video input object is selected;
receive an audio-video selecting instruction from the user;
obtain an audio-video file corresponding to the audio-video selecting instruction;
process the audio-video file by calling the audio-video processing interface; and
upload the processed audio-video file to the network server.

* * * * *